US012741260B2

(12) United States Patent
Pretz et al.

(10) Patent No.: US 12,741,260 B2
(45) Date of Patent: Sep. 22, 2026

(54) SUPPORTED RISER APPARATUSES

(71) Applicant: DOW GLOBAL TECHNOLOGIES LLC, Midland, MI (US)

(72) Inventors: Matthew T. Pretz, Freeport, TX (US); Donald F. Shaw, Denville, NJ (US); Fermin Alejandro Sandoval, Houston, TX (US); Richard Edwards Walter, Long Valley, NJ (US); Albert Meza, Houston, TX (US)

(73) Assignee: Dow Global Technologies LLC, Midland, MI (US)

( * ) Notice: Subject to any disclaimer, the term of this patent is extended or adjusted under 35 U.S.C. 154(b) by 668 days.

(21) Appl. No.: 18/257,361

(22) PCT Filed: Dec. 14, 2021

(86) PCT No.: PCT/US2021/063211
§ 371 (c)(1),
(2) Date: Jun. 14, 2023

(87) PCT Pub. No.: WO2022/132699
PCT Pub. Date: Jun. 23, 2022

(65) Prior Publication Data

US 2024/0024836 A1 Jan. 25, 2024

Related U.S. Application Data

(60) Provisional application No. 63/126,080, filed on Dec. 16, 2020.

(51) Int. Cl.
*B01J 8/26* (2006.01)
*B01J 8/18* (2006.01)

(52) U.S. Cl.
CPC ............... *B01J 8/1872* (2013.01); *B01J 8/26* (2013.01); *B01J 2208/00884* (2013.01)

(58) Field of Classification Search
CPC ... B01J 8/26; B01J 8/1872; B01J 2208/00884
See application file for complete search history.

(56) References Cited

U.S. PATENT DOCUMENTS 3,475,326 A 10/1969 Luckenbach
3,645,992 A 2/1972 Elston
(Continued)

FOREIGN PATENT DOCUMENTS

CA 2073842 A1 7/1992
CN 104437274 B 3/2015
(Continued)

OTHER PUBLICATIONS

Saudi Arabian Substantive Examination Report dated Apr. 7, 2024, pertaining to SA Patent Application No. 523441058, 5 pgs.
(Continued)

*Primary Examiner* — Randy Boyer
(74) *Attorney, Agent, or Firm* — Dinsmore & Shohl LLP

(57) ABSTRACT

A supported riser apparatus may be housed at least partially within a vessel. The supported riser apparatus may include a riser including a non-vertical riser segment, a non-linear riser segment, and a vertical riser segment. The supported riser apparatus may further include a support member comprising a proximal end and a distal end. The proximal end of the support member may be connected to the non-vertical riser segment and the angle between the support member and the non-vertical riser segment may be from 15 to 75. The supported riser apparatus may include a support structure connected to the riser and the support member and an expansion guide connected to an interior surface of the vessel. The expansion guide may be shaped and positioned such that the support member slides across the expansion guide as the support member undergoes thermal expansion or thermal contraction.

15 Claims, 5 Drawing Sheets

(56) References Cited

U.S. PATENT DOCUMENTS

| | | | | |
|---|---|---|---|---|
| 3,914,342 A | | 10/1975 | Mitchell | |
| 4,076,698 A | | 2/1978 | Anderson et al. | |
| 4,502,947 A | | 3/1985 | Haddad et al. | |
| 4,547,341 A | | 10/1985 | Weber | |
| 4,579,716 A | | 4/1986 | Krambeck et al. | |
| 4,588,558 A | | 5/1986 | Kam et al. | |
| 4,599,392 A | | 7/1986 | McKinney et al. | |
| 4,725,410 A | * | 2/1988 | Krug ...................... | C10G 11/18 422/147 |
| 5,156,817 A | | 10/1992 | Luckenbach | |
| 5,190,650 A | | 3/1993 | Tammera et al. | |
| 5,272,236 A | | 12/1993 | Lai et al. | |
| 5,275,641 A | | 1/1994 | Tammera et al. | |
| 5,278,272 A | | 1/1994 | Lai et al. | |
| 5,368,721 A | | 11/1994 | Terry et al. | |
| 5,540,893 A | | 7/1996 | English | |
| 5,582,923 A | | 12/1996 | Kale et al. | |
| 5,733,155 A | | 3/1998 | Sagawa | |
| 5,854,045 A | | 12/1998 | Fang et al. | |
| 6,857,814 B2 | | 2/2005 | Jensen | |
| 7,272,204 B2 | | 9/2007 | Jensen | |
| 7,476,428 B2 | | 1/2009 | Burki et al. | |
| 8,669,406 B2 | | 3/2014 | Pretz et al. | |
| 9,695,306 B2 | | 7/2017 | Ambroise | |
| 9,802,394 B2 | | 10/2017 | Cavacas et al. | |
| 10,357,913 B2 | | 7/2019 | Dou et al. | |
| 2004/0076554 A1 | | 4/2004 | Kuechler et al. | |
| 2006/0130443 A1 | | 6/2006 | Dirkse et al. | |
| 2008/0050545 A1 | | 2/2008 | Harvey | |
| 2009/0155584 A1 | | 6/2009 | Rolland et al. | |
| 2009/0283445 A1 | | 11/2009 | Tammera et al. | |
| 2012/0028058 A1 | | 2/2012 | Paolilli et al. | |
| 2012/0234725 A1 | | 9/2012 | Palmas et al. | |
| 2017/0361295 A1 | | 12/2017 | Pretz et al. | |
| 2018/0134012 A1 | | 5/2018 | Barreneche | |
| 2019/0314782 A1 | | 10/2019 | Pretz et al. | |
| 2020/0231521 A1 | | 7/2020 | Pretz et al. | |
| 2020/0346177 A1 | | 11/2020 | Amblard et al. | |

FOREIGN PATENT DOCUMENTS

| | | | |
|---|---|---|---|
| EP | 1046696 | A2 | 10/2000 |
| EP | 1628774 | B1 | 4/2012 |
| EP | 2064057 | B1 | 3/2017 |
| EP | 3227370 | B1 | 11/2019 |
| JP | 1954001975 | B | 4/1954 |
| JP | H10-311893 | A | 11/1998 |
| JP | 2000233471 | A | 8/2000 |
| JP | 5479067 | B2 | 2/2014 |
| JP | 2014175121 | A | 9/2014 |
| JP | 2020519487 | A | 7/2020 |
| WO | 1995000603 | A1 | 1/1995 |
| WO | 2007117384 | A1 | 10/2007 |
| WO | 2015173199 | A1 | 11/2015 |
| WO | 2017139031 | A1 | 8/2017 |
| WO | 2017186953 | A1 | 11/2017 |
| WO | 2018069029 | A1 | 4/2018 |
| WO | 2018071513 | A1 | 4/2018 |
| WO | 2018200366 | A1 | 11/2018 |
| WO | 2019126189 | A1 | 6/2019 |
| WO | 2019191825 | A1 | 10/2019 |
| WO | 2019243456 | A1 | 12/2019 |
| WO | 2020009860 | A1 | 1/2020 |
| WO | 2020046978 | A1 | 3/2020 |
| WO | 2020112148 | A1 | 4/2020 |
| WO | 2020167929 | A1 | 8/2020 |
| WO | 2020263884 | A1 | 12/2020 |
| WO | 2021024119 | A1 | 2/2021 |
| WO | 2021118739 | A1 | 6/2021 |

OTHER PUBLICATIONS

Russian Office Action dated Apr. 22, 2024, pertaining to RU Patent Application No. 2023117790, 14 pgs.

US Non-Final Office Action dated May 6, 2025, pertaining to U.S. Appl. No. 18/257,329, 17 pgs.

Sadeghbeigi “Fluid Catalytic Cracking Handbook,” Chapter 11, pp. 223, 224, 239, 240 Elsevier. https://app.knovel.com/hotlink/pdf/id:kt009IVL13/fluid-catalytic-cracking/refractory-quality (Year: 2012).

Kuwait Examination Report dated Apr. 28, 2025, pertaining to KW Patent Application No. KW/P/2023/003388, 6 pgs.

International Search Report and Written Opinion dated Apr. 8, 2022, pertaining to International Patent Application No. PCT/US2021/063293.

International Search Report and Written Opinion dated Mar. 29, 2022, pertaining to International Patent Application No. PCT/US2021/063220.

International Search Report and Written Opinion issued by the European Patent Office acting as International Searching Authority for International Patent Application No. PCT/US2021/063211 dated Mar. 14, 2022 (16 total pages).

International Search Report and Written Opinion issued by the European Patent Office acting as International Searching Authority for International Patent Application No. PCT/US2021/063221 dated Mar. 14, 2022 (16 total pages).

Chinese Office Action dated Oct. 29, 2025, pertaining to CN Patent Application No. 202180082415.6, 8 pgs.

US Non-Final Office Action dated Oct. 29, 2025, pertaining to U.S. Appl. No. 18/257,329, 14 pgs.

Grace et al., “Introduction to circulating fluidized beds.” Circulating Fluidized Beds (1997), pp. 1-20.

Kuwait Office Action dated Apr. 13, 2025, pertaining to KW Patent Application No. KW/P/2023/003387, 7 pgs.

Chinese Office Action dated Jun. 20, 2025, pertaining to CN Patent Application No. 2021800824156, 14 pgs.

International Search Report and Written Opinion dated Nov. 29, 2022, pertaining to Int'l Patent Application No. PCT/US2022/075061.

International Search Report and Written Opinion dated Nov. 30, 2022, pertaining to Int'l Patent Application No. PCT/US2022/041037.

Saudi Arabian Substantive Examination Report dated Mar. 19, 2024, pertaining to SA Patent Application No. 523441242, 17 pgs.

Korean Office Action dated Nov. 27, 2025, pertaining to KR Patent Application No. 10-2023-7023305, 7 pgs.

Chinese Office Action dated Dec. 19, 2025, pertaining to CN Patent Application No. 202180081720.3, 10 pgs.

Chinese Office Action dated Dec. 24, 2025, pertaining to CN Patent Application No. 202280054178.7, 15 pgs.

Saudi Arabian Second Substantive Examination Report dated Dec. 9, 2024, pertaining to SA Patent Application No. 523441106, 7 pgs.

Japanese Notice of Reasons for Refusal dated Jan. 28, 2026, pertaining to JP Patent Application No. 2023-535021, 6 pgs.

US Office Action dated Apr. 29, 2026, pertaining to U.S. Appl. No. 18/257,364, 8 pgs.

US Non-Final Office Action dated Apr. 29, 2026, pertaining to U.S. Appl. No. 18/257,328, 10 pgs.

US Non-Final Office Action dated Apr. 20, 2026, pertaining to U.S. Appl. No. 18/681,732, 6 pgs.

US Non-Final Office Action dated Mar. 25, 2026, pertaining to U.S. Appl. No. 18/681,733 6 pgs.

Brazilian Technical Report dated Feb. 5, 2026, pertaining to BR Patent Application No. BR112023011215.0, 8 pgs.

Brazilian Technical Report dated Feb. 18, 2026, pertaining to BR Patent Application No. BR112023011226.5, 8 pgs.

Brazilian Technical Report dated Feb. 26, 2026, pertaining to BR Patent Application No. BR112023011402.0, 8 pgs.

Chinese Office Action dated Mar. 18, 2026, pertaining to CN Patent Application No. 202180082620.2, 13 pgs.

Chinese Office Action dated Apr. 4, 2026, pertaining to CN Patent Application No. 202280054164.5, 15 pgs.

US Non-Final Office Action dated Jun. 4, 2026, pertaining to U.S. Appl. No. 18/257,364, 11 pgs.

US Notice of Allowance dated May 19, 2026, pertaining to U.S. Appl. No. 18/257,329, 10 pgs.

Japanese Office Action dated Apr. 22, 2026, pertaining to JP Patent Application No. 2024-509478, 8 pgs.

(56) References Cited

OTHER PUBLICATIONS

Chinese Office Action dated Jun. 3, 2026, pertaining to CN Patent Application No. 202180081370.0, 11 pgs.
Japanese Office Action dated May 25, 2026, pertaining to JP Patent Application No. 2024-509477, 6 pgs.

* cited by examiner

SUPPORTED RISER APPARATUSES

CROSS-REFERENCE TO RELATED APPLICATIONS

This application is a National Stage Entry under 35 U.S.C. § 371 of International Patent Application No. PCT/US2021/063211, filed Dec. 14, 2021, which claims the benefit of and priority to U.S. Provisional Patent Application Ser. No. 63/126,080 filed on Dec. 16, 2020, and entitled "Supported Riser Apparatuses," the entire contents of both of which are incorporated by reference in the present disclosure.

TECHNICAL FIELD

Embodiments described herein generally relate to chemical processing and, more specifically, to apparatuses for chemical processing.

BACKGROUND

Many chemicals provide feedstocks for forming basic materials. For example, light olefins may be utilized as base materials to produce many types of goods and materials, where ethylene may be utilized to manufacture polyethylene, ethylene chloride, or ethylene oxides. Such products may be utilized in product packaging, construction, textiles, etc. Thus, there is an industry demand for light olefins, such as ethylene, propylene, and butene. Some chemicals, such as light olefins, may be produced by reaction processes that utilize riser reactors. Risers may be used in reaction, as well as the regeneration of catalysts utilized in the process.

SUMMARY

In some embodiments, such as those described herein, risers may be utilized which are non-vertical. For example, portions of such non-vertical risers may be diagonal in orientation. However, complications may arise in the design of chemical processing systems which utilize such risers. For example, designs in many embodiments should be able to account for the thermal expansion and contraction of the various system units during the production of light olefins. Additionally, as reactors become large and heavy, designing mechanical support systems for reactor systems becomes troublesome. As is identified by the present disclosure, non-vertical risers that expand under hot conditions introduce significant horizontal expansion of the riser, whereas many conventional risers are strictly vertical in orientation and expand only vertically.

Presently disclosed support systems, such as the supported risers disclosed herein, address these problems in some or all respects. In one or more embodiments, a riser may be supported within a vessel by a support member, a support structure and an expansion guide. Supported riser apparatuses according to one or more embodiments disclosed herein may allow scaled-up risers to be safely positioned within a vessel by providing adequate mechanical support. Additionally, the structure of the supported riser apparatus may allow the riser to be supported even when the riser undergoes thermal expansion during the exposure to high temperatures, such as during the production of light olefins by dehydrogenation. Embodiments disclosed herein utilize a support member which may "slide" horizontally when expanded by heating and subsequent cooling. Such supported risers may be utilized in reactor systems that include reactors and catalyst regenerators, among other uses.

According to one or more embodiments disclosed herein, a supported riser apparatus may be housed at least partially within a vessel. The supported riser apparatus may comprise a riser comprising a non-vertical riser segment, a non-linear riser segment, and a vertical riser segment. The non-linear riser segment may connect the non-vertical riser segment and the vertical riser segment. The non-vertical riser segment may enter the vessel through a riser port. The supported riser apparatus may further comprise a support member comprising a proximal end and a distal end. The proximal end of the support member may be connected to the non-vertical riser segment at a riser attachment point. The riser attachment point may be proximate the riser port. The support member may extend substantially horizontally from the riser attachment point across a width of the vessel. An angle between the support member and the non-vertical riser segment may be from 15° to 75°. The supported riser apparatus may further comprise a support structure connected to the riser and the support member. The support structure may be connected to the riser between the riser attachment point and vertical riser segment. The support structure may be connected to the support member between the proximal end and the distal end. The supported riser apparatus may further comprise an expansion guide connected to an interior surface of the vessel. The expansion guide may be shaped and positioned such that the support member slides across the expansion guide as the support member undergoes thermal expansion or thermal contraction.

It is to be understood that both the foregoing brief summary and the following detailed description present embodiments of the technology, and are intended to provide an overview or framework for understanding the nature and character of the technology as it is claimed. The accompanying drawings are included to provide a further understanding of the technology, and are incorporated into and constitute a part of this specification. The drawings illustrate various embodiments and, together with the description, serve to explain the principles and operations of the technology. Additionally, the drawings and descriptions are meant to be merely illustrative, and are not intended to limit the scope of the claims in any manner.

Additional features and advantages of the technology disclosed herein will be set forth in the detailed description that follows, and in part will be readily apparent to those skilled in the art from that description or recognized by practicing the technology as described herein, including the detailed description that follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

Figure 1:
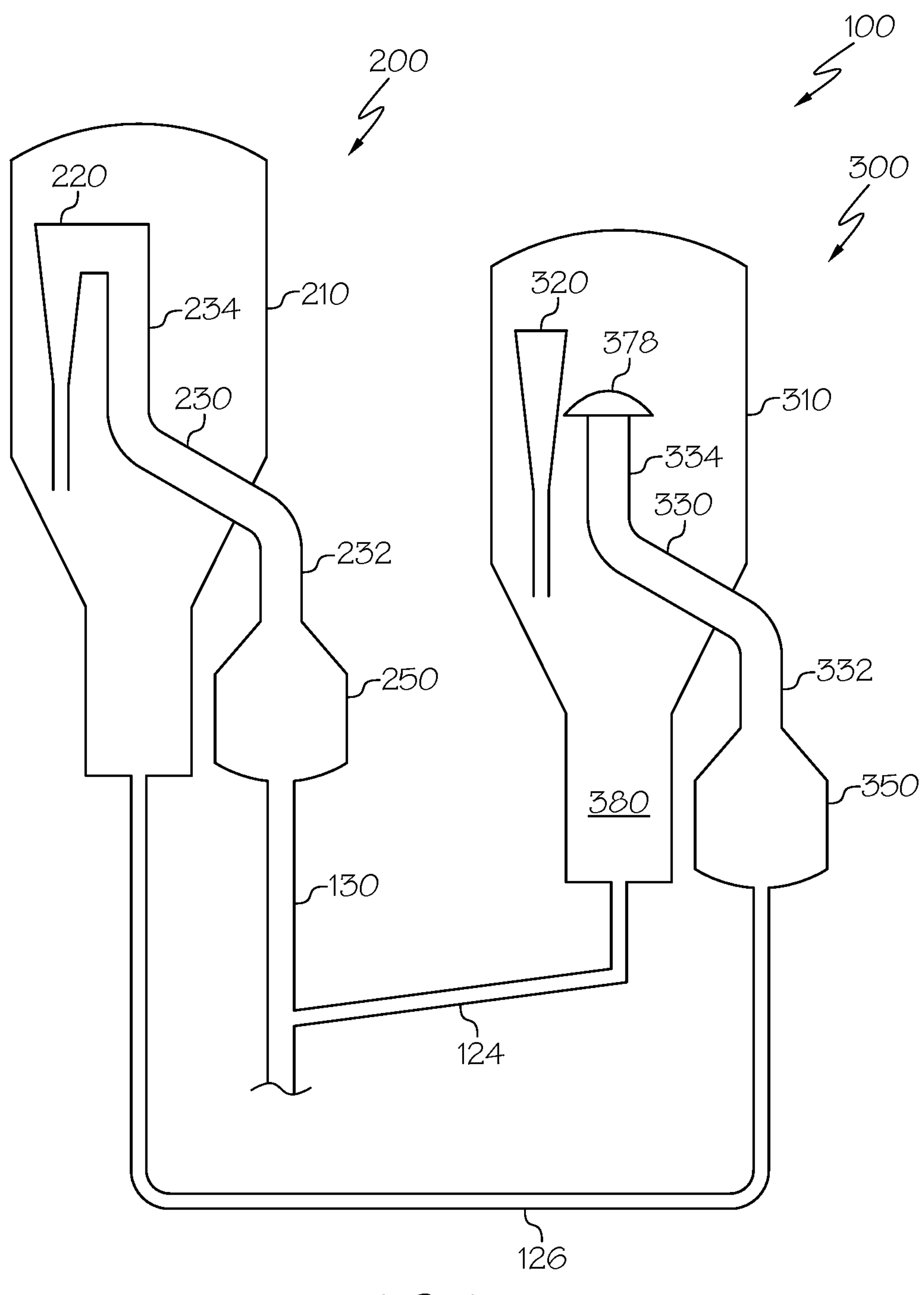
FIG. 1 schematically depicts a reactor system, according to one or more embodiments disclosed herein.

It should be understood that the drawings are schematic in nature, and do not include some components of a fluid catalytic reactor system commonly employed in the art, such as, without limitation, temperature transmitters, pressure transmitters, flow meters, pumps, valves, and the like. It would be known that these components are within the spirit and scope of the present embodiments disclosed. However, operational components, such as those described in the present disclosure, may be added to the embodiments described in this disclosure.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Described herein are one or more embodiments of supported riser apparatuses. In some embodiments disclosed herein, the risers are disclosed for use in either reactor sections or catalyst regeneration sections of reactor systems. Such embodiments may utilize a recycled solid catalyst in a fluidized bed. Specific example embodiments disclose the risers in use in dehydrogenation reaction systems designed to form light olefins. However, it should be understood that the risers herein may be utilized in a wide variety of chemical processes and systems. As would be appreciated by one skilled in the art, the technology disclosed herein may find wide applicability to mechanical design of chemical processing systems that utilize risers and, in particular, utilize risers which have some non-vertical component.

As described herein, a supported riser apparatus may be utilized within reactor systems for producing light olefins from hydrocarbon feed streams. The reactor systems and methods for producing light olefins will now be discussed in detail. Now referring to FIG. 1, an example reactor system 100 is schematically depicted. The reactor system 100 generally comprises multiple system units, such as a reactor section 200 and a regenerator section 300. As used herein in the context of FIG. 1, a reactor section 200 generally refers to the portion of a reactor system 100 in which the major process reaction takes place, and the particulate solids are separated from the olefin-containing product stream of the reaction. In one or more embodiments, the particulate solids may be spent, meaning that they are at least partially deactivated. Also, as used herein, a regenerator section 300 generally refers to the portion of a fluid catalytic reactor system where the particulate solids are regenerated, such as through combustion, and the regenerated particulate solids are separated from the other process material, such as evolved gasses from the combusted material previously on the spent particulate solids or from supplemental fuel. The reactor section 200 generally includes a reaction vessel 250, a riser 230 including an exterior riser segment 232 and an interior riser segment 234, and a particulate solid separation section 210. The regenerator section 300 generally includes a particulate solid treatment vessel 350, a riser 330 including an exterior riser segment 332 and an interior riser segment 334, and a particulate solid separation section 310. Generally, the particulate solid separation section 210 may be in fluid communication with the particulate solid treatment vessel 350, for example, by standpipe 126, and the particulate solid separation section 310 may be in fluid communication with the reaction vessel 250, for example, by standpipe 124 and transport riser 130.

Generally, the reactor system 100 may be operated by feeding a hydrocarbon feed and fluidized particulate solids into the reaction vessel 250, and reacting the hydrocarbon feed by contact with fluidized particulate solids to produce an olefin-containing product in the reaction vessel 250 of the reactor section 200. The olefin-containing product and the particulate solids may be passed out of the reaction vessel 250 and through the riser 230 to a gas/solids separation device 220 in the particulate solid separation section 210, where the particulate solids may be separated from the olefin-containing product. The particulate solids may then be transported out of the particulate solid separation section 210 to the particulate solid treatment vessel 350. In the particulate solid treatment vessel 350, the particulate solids may be regenerated by chemical processes. For example, the spent particulate solids may be regenerated by one or more of oxidizing the particulate solid by contact with an oxygen containing gas, combusting coke present on the particulate solids, and combusting a supplemental fuel to heat the particulate solid. The particulate solids may then be passed out of the particulate solid treatment vessel 350 and through the riser 330 to a riser termination device 378, where the gas and particulate solids from the riser 330 are partially separated. The gas and remaining particulate solids from the riser 330 are transported to gas/solids separation device 320 in the particulate solid separation section 310 where the remaining particulate solids are separated from the gasses from the regeneration reaction. The particulate solids, separated from the gasses, may be passed to a solid particulate collection area 380. The separated particulate solids are then passed from the solid particulate collection area 380 to the reaction vessel 250, where they are further utilized. Thus, the particulate solids may cycle between the reactor section 200 and the regenerator section 300.

As described herein, portions of system units such as reaction vessel walls, separation section walls, or riser walls, may comprise a metallic material, such as carbon or stainless steel or higher temperature alloys such as incoloy. In addition, the walls of various system units may have portions that are attached with other portions of the same system unit or to another system unit. Sometimes, the points of attachment or connection are referred to herein as "attachment points" and may incorporate any known bonding medium such as, without limitation, a weld, an adhesive, a solder, etc. It should be understood that components of the system may be "directly connected" at an attachment point, such as a weld. It should further be understood that two components that are "proximate" on another are in direct contact or immediately near one another such that a relatively small intermediate parts such as connectors or adhesive materials connects them.

Figure 2:
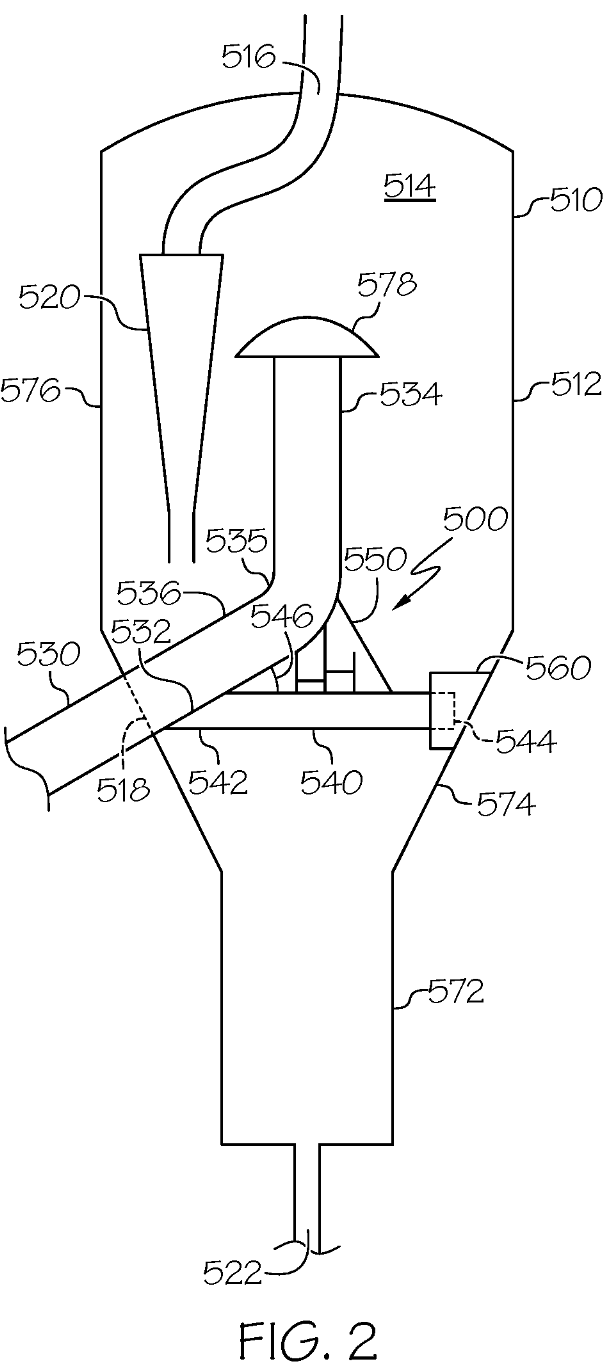
FIG. 2 schematically depicts a supported riser apparatus, according to one or more embodiments disclosed herein.

Referring now to FIG. 2, a supported riser apparatus 500 may be at least partially housed within a vessel 510 and the supported riser apparatus 500 may comprise a riser 530, a support member 540, a support structure 550, and an expansion guide 560. As is described herein, the vessel 510 may be representative of the particulate solid separation section 210 or 310 of FIG. 1. However, it should be understood that the embodiment of FIG. 2 may be utilized in other systems than that represented by FIG. 1.

In one or more embodiments, the vessel 510 may be a particulate solid separation section. For example, in the embodiments depicted in FIG. 1, each of particulate solid separation section 210, particulate solid separation section 310, or both may be a vessel such as vessel 510 depicted in FIG. 2. As such, the vessel 510 may comprise an outer shell 512 where the outer shell 512 may define an interior region 514 of the vessel 510. The outer shell 512 may comprise a riser port 518, a gas outlet port 516, and a particulate solid outlet port 522. The vessel 510 may house at least a portion of the supported riser apparatus 500 and a gas/solids separation device 520 in the interior region 514 of the vessel 510.

Generally, "inlet ports" and "outlet ports" of any system unit described herein refer to openings, holes, channels, apertures, gaps, or other like mechanical features in the system unit. For example, inlet ports allow for the entrance of materials to the particular system unit and outlet ports allow for the exit of materials from the particular system unit. Generally, an outlet port or inlet port will define the area of a system unit to which a pipe, conduit, tube, hose, transport line, or like mechanical feature is attached, or to a portion of the system unit to which another system unit is directly attached. While inlet ports and outlet ports may sometimes be described herein functionally in operation, they may have similar or identical physical characteristics, and their respective functions in an operational system should not be construed as limiting on their physical structures. Other ports, such as the riser port 518, may comprise an opening in the given system unit where other system units are directly attached, such as where the riser 530 extends into the vessel 510 at the riser port 518.

In one or more embodiments, the outer shell 512 of the vessel 510 may define an upper segment 576, a middle segment 574, and a lower segment 572 of the vessel 510. Generally, the upper segment 576 may have a substantially constant cross sectional area, such that the cross sectional area does not vary by more than 20% in the upper segment 576. In one or more embodiments, the cross sectional area of the upper segment 576 may be at least three times the maximum cross sectional area of the riser 530. For example, the cross sectional area of the upper segment 576 may be at least 3 times, at least 4 times, at least 5 times, at least 6 times, at least 7 times, at least 8 times, at least 9 times, at least 10 times, at least 12 times, at least 15 times, or even at least 20 times the maximum cross sectional area of the riser 530. In further embodiments, the maximum cross sectional area of the upper segment 576 may be from 5 to 40 times the maximum cross sectional area of the riser 530. For example, the maximum cross sectional area of the upper segment 576 may be from 5 to 40, from 10 to 40, from 15 to 40, from 20 to 40, from 25 to 40, from 30 to 40, from 35 to 40, from 5 to 35, from 5 to 30, from 5 to 25, from 5 to 20, from 5 to 15, or even from 5 to 10 times the maximum cross sectional area of the riser 530. As described herein, unless otherwise explicitly stated, the "cross sectional area" refers to the area of the cross section of a portion of a system unit in a plane substantially orthogonal to the direction of general flow of reactants and/or products.

Additionally, in one or more embodiments, the lower segment 572 of the vessel 510 may have a substantially constant cross sectional area, such that the cross sectional area does not vary by more than 20% in the lower segment 572. The cross sectional area of the lower segment 572 may be larger than the maximum cross sectional area of the riser 530 and smaller than the maximum cross sectional area of the upper segment 576. The middle segment 574 may be shaped as a frustum where the cross sectional area of the middle segment 574 is not constant and the cross sectional area of the middle segment 574 transitions from the cross sectional area of the upper segment 576 to the cross sectional area of the lower segment 572 throughout the middle segment 574.

In one or more embodiments, the supported riser apparatus 500 may comprise a riser 530. For example, a supported riser apparatus 500 may comprise riser 230 or riser 330 of FIG. 1. Generally, the riser 530 may act to transport reactants, products, and/or particulate solids from a reaction vessel 250 or particulate solid treatment vessel 350 of FIG. 1 to the gas/solids separation device 520 housed within vessel 510 of FIG. 2. In one or more embodiments, the riser 530 may be generally cylindrical in shape (i.e., having a substantially circular cross sectional shape), or may alternately be non-cylindrically shaped, such as prism shaped with cross sectional shape of triangles, rectangles, pentagons, hexagons, octagons, ovals, or other polygons or curved closed shapes, or combinations thereof. The riser may generally include a metallic frame, and may additionally include refractory linings or other materials utilized to protect the metallic frame and/or control process conditions.

The riser 530 may comprise a vertical riser segment 534, a non-vertical riser segment 536, and a non-linear riser segment 535. As described herein, a "non-linear riser segment" may refer to a riser segment comprising a curve or a mitered junction. The non-linear riser segment 535 may be positioned between the vertical riser segment 534 and the non-vertical riser segment 536 and may connect the vertical riser segment 534 and the non-vertical riser segment 536. In one or more embodiments, the non-vertical riser segment may extend through the riser port 518. As such, the non-vertical riser segment 536 may be adjacent to the riser port 518 or even directly connected to the riser port 518. The riser port 518 may be located in the outer shell 512 of the vessel 510 in either the upper segment 576 or the middle segment 574 of the vessel 510. As displayed in FIG. 2, the riser 530 extends through the riser port 518 in the middle segment 574 of the vessel 510.

In one or more embodiments, the non-vertical riser segment 536 may extend through the riser port 518 in a diagonal direction where the diagonal direction is 15 to 75 degrees from vertical. For example, the diagonal direction may be from 15 to 75 degrees from vertical, from 20 to 75 degrees from vertical, from 25 to 75 degrees from vertical, from 30 to 75 degrees from vertical, from 35 to 75 degrees from vertical, from 40 to 75 degrees from vertical, from 45 to 75 degrees from vertical, from 50 to 75 degrees from vertical, from 55 to 75 degrees from vertical, from 60 to 75 degrees from vertical, from 65 to 75 degrees from vertical, from 70 to 75 degrees from vertical, from 15 to 70 degrees from vertical, from 15 to 65 degrees from vertical, from 15 to 60 degrees from vertical, from 15 to 55 degrees from vertical, from 15 to 50 degrees from vertical, from 15 to 45 degrees from vertical, from 15 to 40 degrees from vertical, from 15 to 35 degrees from vertical, from 15 to 30 degrees from vertical, from 15 to 25 degrees from vertical, from 15 to 20 degrees from vertical, or any combination or sub-combination of these ranges.

According to one or more embodiments, in the upper segment 576 of the vessel 510, the riser 530 may be in fluid communication with the gas/solids separation device 520. For example, the vertical riser segment 534 of the riser 530 may be directly connected to the gas/solids separation device 520. In such embodiments, there may be a break in the vertical riser segment 534 or vertical riser segment 534 may comprise a sleeve to accommodate thermal expansion and contraction of vertical riser segment 534. The gas/solids separation device 520 may be any mechanical or chemical separation device that may be operable to separate particulate solids from gas or liquid phases, such as a cyclone or a plurality of cyclones. Referring to FIG. 2, the vertical riser segment 534 may be directly connected to a riser termination device 578. In such embodiments, there may not be a mechanical connection between the vertical riser segment 534 and the gas/solids separation device 520.

According to one or more embodiments, the gas/solids separation device 520 may be a cyclonic separation system, which may include two or more stages of cyclonic separation. In embodiments where the gas/solids separation device 520 comprises more than one cyclonic separation stages, the first separation device into which the fluidized stream enters is referred to a primary cyclonic separation device. The fluidized effluent from the primary cyclonic separation device may enter into a secondary cyclonic separation device for further separation. Primary cyclonic separation devices may include, for example, primary cyclones, and systems commercially available under the names VSS (commercially available from UOP), LD2 (commercially available from Stone and Webster), and RS2 (commercially available from Stone and Webster). Primary cyclones are described, for example, in U.S. Pat. Nos. 4,579,716; and 5,275,641, which are each incorporated by reference in their entirety herein. In some separation systems utilizing primary cyclones as the primary cyclonic separation device, one or more set of additional cyclones, e.g. secondary cyclones and tertiary cyclones, are employed for further separation of the particulate solids from the product gas. It should be understood that any primary cyclonic separation device may be used in embodiments disclosed herein.

In one or more alternative embodiments, the outer shell 512 may further house a riser termination device, not depicted in FIG. 2. The riser termination device may be positioned proximate to the vertical riser segment 534. In one or more embodiments, the riser termination device may be directly connected to the vertical riser segment 534 of the riser 530. The gas and particulate solids passing through the riser 530 may be at least partially separated by riser termination device. The gas and remaining particulate solids may be transported to a secondary separation device, gas/solids separation device 520 in the vessel 510.

Generally, the gas/solids separation device 520 may be operable to deposit separated particulate solids into the bottom of the upper segment 576 or into the middle segment 574 or lower segment 572 of the vessel 510. The separated vapors may be removed from the vessel 510 via a pipe connected to gas outlet port 516 of the vessel 510. Additionally, particulate solids may be removed from the vessel 510 via a pipe connected to particulate solid outlet port 522.

In one or more embodiments, the supported riser apparatus 500 may comprise a support member 540. The support member 540 may comprise a proximal end 542 and a distal end 544. The proximal end 542 of the support member 540 may be connected to the riser 530 at an attachment point 532. In one or more embodiments, the proximal end 542 of the support member 540 may be directly connected to the riser 530 at the attachment point 532. For example, the proximal end 542 of the support member may be welded to the riser 530 at the attachment point 532. In one or more embodiments, the proximal end 542 of the support member 540 may be connected to the non-vertical riser segment 536. The attachment point 532 may be proximate to the riser port 518. As such, the attachment point 532 may be on the non-vertical riser segment 536, and the attachment point 532 may be closer to the riser port 518 than the non-linear riser segment 535. In one or more embodiments, the attachment point 532 may be proximate to the lower portion of the riser port 518. As such, the attachment point 532 may be on a portion of the non-vertical riser segment 536 that is oriented toward the lower segment 572 of the vessel 510.

Generally, the support member 540 may be any shape suitable for extending across a width of the vessel 510 and supporting the riser 530. In one or more embodiments, the support member 540 may be generally cylindrical in shape (i.e., having a substantially circular cross section), or may alternately be non-cylindrically shaped, such as prism shaped with cross-sectional shaped of triangles, rectangles, pentagons, hexagons, octagons, ovals, or other polygons or curved closed shapes, or combinations thereof. In one or more embodiments, the cross sectional shape of the support member 540 may be substantially the same from the proximal end 542 of the support member 540 to the distal end 544 of the support member. In one or more embodiments, the support member 540 may be substantially solid. In alternative embodiments, the support member 540 may comprise at least one hollow area. For example, the support member 540 may be a pipe in one or more embodiments.

In one or more embodiments, the riser 530 and the support member 540 may both be substantially cylindrical. In such embodiments, the diameter of the riser 530 may be greater than or equal to the diameter of the support member 540. In one or more embodiments, the ratio of the diameter of the riser 530 to the diameter of the support member 540 may be from 1 to 10. For example, the ratio of the diameter of the riser 530 to the diameter of the support member 540 may be from 1 to 10, from 2 to 10, from 3 to 10, from 4 to 10, from 5 to 10, from 6 to 10 from 7 to 10, from 8 to 10, from 9 to 10, from 1 to 9, from 1 to 8, from 1 to 7, from 1 to 6, from 1 to 5, from 1 to 4, from 1 to 3, from 1 to 2, or any combination or sub-combination of these ranges.

The support member 540 may extend across a width of the vessel 510. In one or more embodiments, the vessel 510 may have a substantially circular cross section. In such embodiments, the support member 540 may extend across a diameter or a chord of the vessel 510. Generally, the support member 540 may extend across a width of the vessel 510 in a substantially horizontal manner. As described herein, "substantially horizontal" refers to an orientation within within 5°, or even within 2° of horizontal.

In one or more embodiments, the support member 540 and the non-vertical riser segment 536 may be positioned such that an angle 546 between the support member 540 and the non-vertical riser segment 536 may be from 15° to 75°. For example, the angle 546 between the support member 540 and the non-vertical riser segment 536 may be from 15 to 75 degrees, from to 75 degrees, from 25 to 75 degrees, from 30 to 75 degrees, from 35 to 75 degrees, from 40 to degrees, from 45 to 75 degrees, from 50 to 75 degrees, from 55 to 75 degrees, from 60 to 75 degrees, from 65 to 75 degrees, from 70 to 75 degrees, from 15 to 70 degrees, from 15 to 65 degrees, from 15 to 60 degrees, from 15 to 55 degrees, from 15 to 50 degrees, from 15 to 45 degrees, from 15 to 40 degrees, from 15 to 35 degrees, from 15 to 30 degrees, from 15 to 25 degrees, from 15 to 20 degrees, or any combination or sub-combination of these ranges. In one or more embodiments, the angle 546 may be measured as displayed in FIG. 2.

The supported riser apparatus 500 may comprise a support structure 550. In one or more embodiments, the support structure 550 may be connected to the riser 530 between the attachment point 532 and the vertical riser segment 534. The support structure 550 may be directly connected to the riser 530 at a single point, at multiple points, or even continuously from the attachment point 532 to the vertical riser segment 534. As such, the support structure 550 may be connected to the non-vertical riser segment 536, the non-linear riser segment 535, or both. The support structure 550 may also be attached to the support member 540 between the proximal end 542 and the distal end 544 of the support member 540. The support structure 550 may be directly connected to the support member 540 at a single point, at multiple points, or even continuously from the proximal end 542 of the support member 540 to the distal end 544 of the support member 540. The support structure 550 may be any suitable structure for distributing the weight of the riser 530 across the support member 540.

Figure 3:
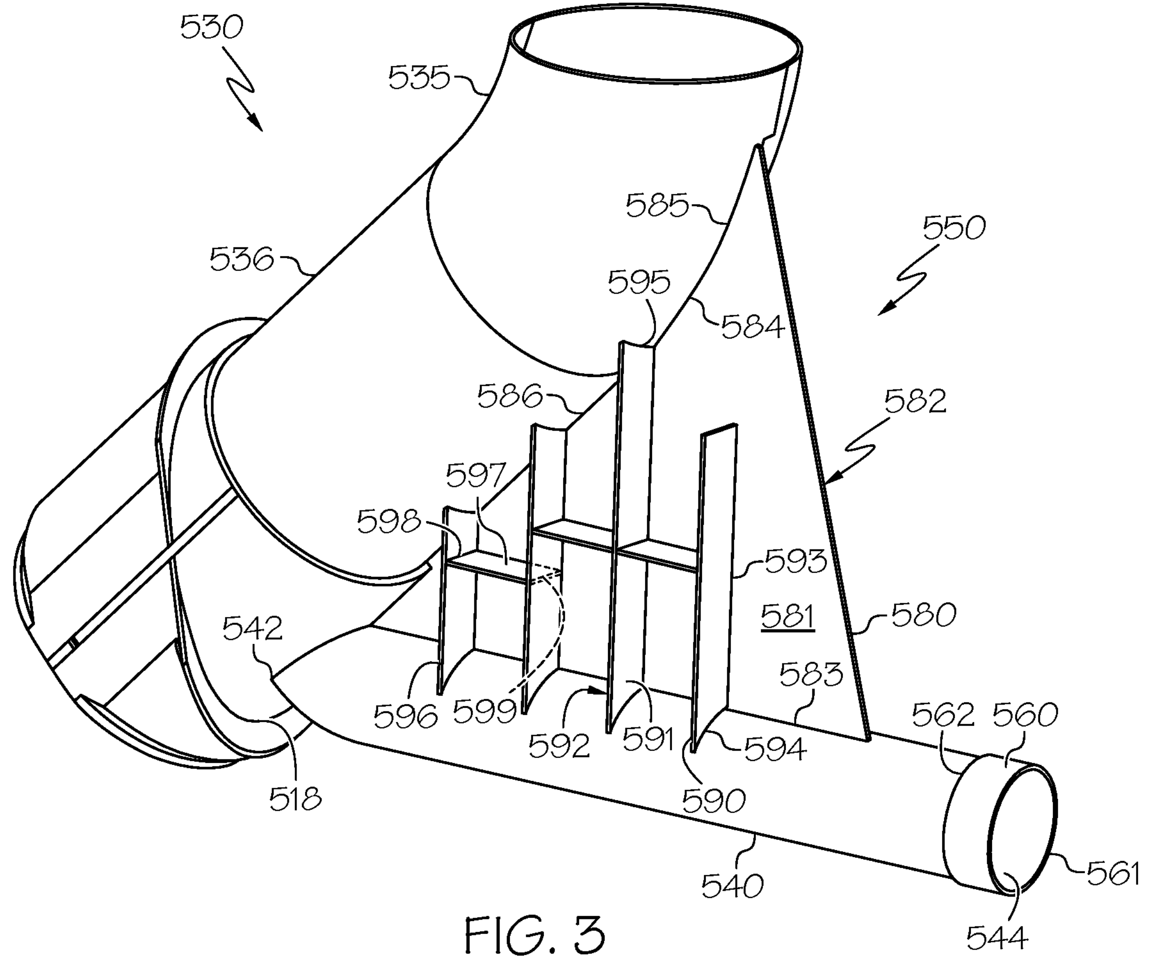
FIG. 3 schematically depicts a supported riser apparatus, according to one or more embodiments disclosed herein.

In one or more embodiments, the support structure 550 may comprise a plate 580. In one or more embodiments, the plate 580 may be substantially vertically aligned, such that the major surfaces of the plate are within 10°, 5°, or even 2° of vertical. Referring now to FIG. 3, the plate 580 may comprise a first side 581 and a second side 582. The first side 581 and the second side 582 may be substantially planar. Additionally, the first side 581 and the second side 582 may be substantially parallel. As described herein, "substantially parallel" refers to an orientation within 10°, within 5°, or even within 2° of parallel. The plate 580 may further comprise a first edge 583. The first edge 583 may be adjacent to the support member 540. In one or more embodiments, the first edge 583 may be directly connected to the support member 540. The first edge may be connected to the support member 540 at one or more points along the support member 540, or even continuously along at least a portion of the support member 540. The plate 580 may further comprise a second edge 584. The second edge 584 may be adjacent to the riser 530. In one or more embodiments, the second edge 584 of the plate 580 may be directly connected to the riser 530.

In one or more embodiments, the second edge 584 of the plate 580 may be adjacent or directly connected to the non-vertical riser segment 536, the non-linear riser segment 535, or both. In embodiments where the second edge 584 of the plate is adjacent to both the non-vertical riser segment 536 and the non-linear riser segment 535, the second edge 584 of the plate 580 may comprise a curved portion 585 and a linear portion 586. The curved portion 585 of the second edge 584 may be curved such that the curvature of the curved portion 585 of the second edge 584 may be substantially the same as the curvature of the non-linear riser segment 535. As such, the curved portion 585 of the second edge 584 of the plate 580 may be adjacent or directly connected to the non-linear riser segment 535. The curved portion 585 of the second edge 584 of the plate 580 may be connected to the non-linear riser segment 535 at one or more points along the non-linear riser segment 535, or even continuously along at least a portion of the non-linear riser segment 535. Furthermore, the linear portion 586 of the plate 580 may be adjacent or directly connected to the non-vertical riser segment 536. The linear portion 586 of the plate 580 may be connected to the non-vertical riser segment 536 at one or more points along the non-vertical riser segment 536, or even continuously along at least a portion of the non-vertical riser segment 536.

Figure 4:
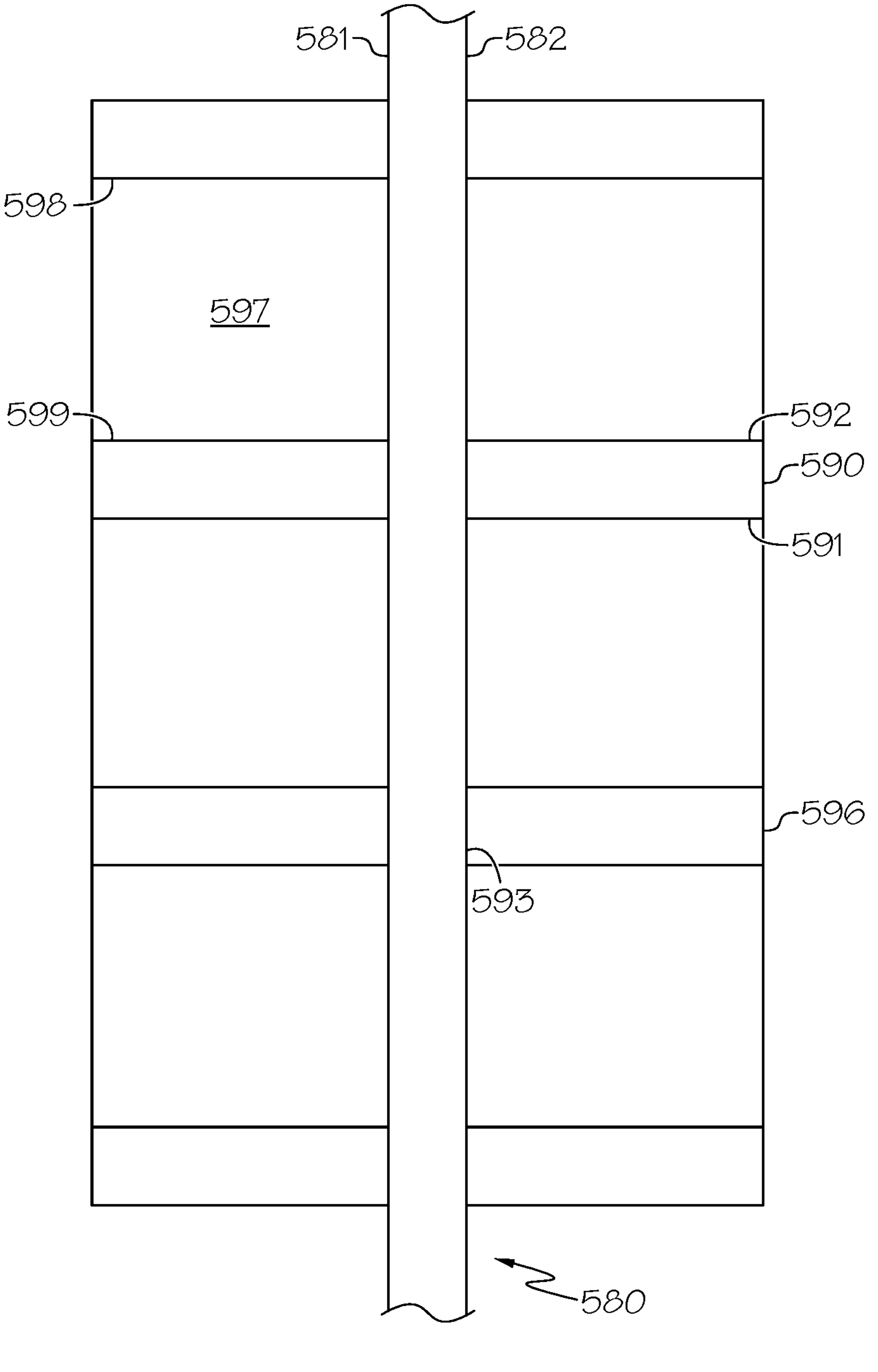
FIG. 4 schematically depicts a top view of a support structure, according to one or more embodiments disclosed herein.

As depicted in FIGS. 3 and 4, the support structure 550 comprising a plate 580 may further comprise one or more planar braces. Each brace 590 may comprise a first side 591 and a second side 592. The first side 591 and the second side 592 of each brace 590 may be substantially planar. Additionally, the first side 591 and the second side 592 of each brace 590 may be substantially parallel. The braces 590 may further comprise a first edge 593. The first edge 593 of each brace 590 may be directly connected to either the first side 581 of the plate 580 or the second side 582 of the plate 580. In one or more embodiments, the braces 590 may be connected to the first side 581 of the plate 580 or the second side 582 of the plate 580 such that braces 590 extend substantially perpendicularly from the first side 581 of the plate 580 or the second side 582 of the plate 580. As described herein, "substantially perpendicular" refers to an orientation within 10°, within 5°, or even within 2° of perpendicular.

As described herein, each brace 590 may have a thickness, wherein the thickness of each brace spans the distance between the first side 591 of the brace 590 and the second side 592 of the brace 590 (the major surfaces of the brace 590). Likewise, the plate 580 may have a thickness, wherein the thickness of the plate 580 spans the distance between the first side 581 of the plate 580 and the second side 582 of the plate 580 (the major surfaces of the plate 580). According to one or more embodiments, the ratio of the thickness of the plate 580 to the thickness of each brace 590 may be from 5:1 to 1:5. For example, ratio of the thickness of the plate 580 to the thickness of each brace 590 may be from 5:1 to 1:5, from 4:1 to 1:5, from 3:1 to 1:5, from 2:1 to 1:5, from 1:1 to 1:5, from 1:2 to 1:5, from 1:3 to 1:5, from 1:4 to 1:5, from 5:1 to 1:4, from 5:1 to 1:3, from 5:1 to 1:2, from 5:1 to 1:1, from 5:1 to 2:1, from 5:1 to 3:1, from 5:1 to 4:1, or any combination or sub-combination of these ranges. In one or more preferred embodiments, the plate 580 and braces 590 may have the same thickness such that the ratio of the thickness of the plate 580 to the thickness of each brace 590 is 1:1.

As displayed in FIG. 3, at least one of the braces 590 may be oriented substantially vertically. As described herein, "substantially vertically" refers to an orientation within 10°, within or even within 2° of vertical. In one or more embodiments, at least one brace 590 may further comprise a second edge 594, where the second edge 594 is adjacent to the support member 540. The second edge 594 may be dimensioned to accommodate the support member 540. For example, in embodiments where the support member 540 is cylindrical, the second edge 594 of the brace 590 may be curved such that the curvature of the second edge 594 of the brace 590 is substantially the same as the curvature of the support member 540. As such, the second edge 594 of the at least one brace 590 may be directly connected to the support member 540.

In one or more embodiments, at least one brace 590 may further comprise a third edge 595, where the third edge 595 is adjacent to the riser 530. The third edge 595 of the at least one brace 590 may be adjacent to either the non-vertical riser segment 536 or the non-linear riser segment 535. In embodiments where the riser 530 is substantially cylindrical, the third edge 595 of the at least one brace 590 may be curved such that the curvature of the third edge 595 of the at least one brace 590 is substantially the same as the curvature of the non-vertical riser segment 536 or the non-linear riser segment 535. As such, the third edge 595 of the at least one brace 590 may be directly connected to the non-vertical riser segment 536 or the non-linear riser segment 535.

Still referring to FIGS. 3 and 4, the support structure 550 may comprise one or more braces 597 oriented substantially horizontally. As described herein, "substantially horizontally" refers to an orientation within 10°, within 5°, or even within 2° of horizontal. Such horizontally oriented braces 597 may be adjacent to one or more braces 590 that are oriented substantially vertically. In one or more embodiments, the horizontally oriented braces 597 may comprise a second edge 598 and a third edge 599, where the second edge 598 or the third edge 599, may be adjacent to a first side 591 or a second side 592 of a vertically oriented brace 590. In one or more embodiments, the second edge 598 or the third edge 599 of a horizontally oriented brace 597 may be directly connected to a first side 591 or a second side 592 of a vertically oriented brace 590. In one or more embodiments, the second edge 598 of a horizontally oriented brace 597 may be adjacent or directly connected to a first side 591 of a vertically oriented brace 590, and the third edge 599 of the horizontally oriented brace 597 may be adjacent or directly connected to the second side 592 of a second vertically oriented brace 590.

In one or more embodiments, braces 590 may extend from both the first side 581 of the plate 580 and the second side 582 of the plate 580. As depicted in FIG. 4, the braces 590 may extend from the first side 581 of the plate 580 and the second side 582 of the plate 580 symmetrically. Alternatively, the braces 590 may extend from the first side 581 of the plate 580 and the second side 582 of the plate 580 asymmetrically.

As described herein, the braces 590 may comprise a fourth edge 596. The fourth edge 596 of the braces 590 may be an air-side edge, where the fourth edge 596 of the brace 590 is not attached to another system unit. Generally, the fourth edge of the brace 590 may be substantially parallel to the first edge 593 of the brace 590. As described herein, each brace 590 may have a width, where the width is the distance from the first edge 593 of the brace to the fourth edge 596 of the brace 590. In one or more embodiments, the ratio of the width of the brace 590 to the thickness of the brace 590 may be from 50 to 5. For example, the ratio of the width of the brace 590 to the thickness of the brace 590 may be from 50 to 5, from 45 to 5, from 40 to 5, from 35 to 5, from 30 to 5, from 25 to 5, from 20 to 5, from 15 to 5, from 10 to 5, from 50 to 10, from 50 to 15, from 50 to 20, from 50 to 25, from 50 to 30, from 50 to 35, from 50 to 40, from 50 to 45, or any combination or sub-combination of these ranges.

In one or more embodiments, the supported riser apparatus 500 may comprise an expansion guide 560. The expansion guide 560 may comprise a proximal end 561 and a distal end 562. The proximal end 561 of the expansion guide 560 may be connected to an interior surface of the outer shell 512 the vessel 510. In one or more embodiments, the expansion guide 560 may be directly connected to an interior surface of the outer shell 512 of the vessel 510. The expansion guide 560 may be positioned on the interior surface of the outer shell 512 such that the support member 540 slides across the expansion guide 560 as the support member 540 undergoes thermal expansion and contraction. In one or more embodiments, the proximal end 561 of the expansion guide 560 may be connected to the interior surface of the outer shell 512 of the vessel 510 opposite the riser port 518. In one or more embodiments, the proximal end 561 of the expansion guide 560 may be connected to the interior surface of the outer shell 512 of the vessel 510 opposite the riser port 518 on a width of the vessel 510. In embodiments where the vessel 510 is substantially cylindrical, the proximal end 561 of the expansion guide 560 may be connected to the interior surface of the outer shell 512 of the vessel 510 on a chord or diameter of the vessel 510.

The distal end 562 of the expansion guide 560 may be dimensioned to accept the distal end 544 of the support member 540. In one or more embodiments, the expansion guide 560 may be trough-shaped, such that the distal end 544 of the support member 540 may slide along the trough-shaped expansion guide 560 and the trough-shaped expansion guide 560 prevents lateral motion of the support member 540. In one or more alternative embodiments, the expansion guide 560 may be shaped as a sleeve, such that lateral and vertical movement of the support member 540 is restricted. In such embodiments, the proximal end 561 of the expansion guide 560 may be closed and the distal end 562 of the expansion guide 560 may be open. As shown in FIG. 3, a cross section of the distal end 562 of the sleeve-shaped expansion guide 560 may be substantially the same shape as a cross section of the distal end 544 of the support member 540, and the cross section of the expansion guide 560 may be substantially constant from the distal end 562 of the expansion guide 560 to the proximal end 561 of the expansion guide 560. For example, the expansion guide 560 may have a substantially circular cross section from the distal end 562 of the expansion guide 560 to the proximal end 561 of the expansion guide 560. Alternatively the cross section of the expansion guide 560 may be non-circularly shaped, having the shape of a triangle, rectangle, pentagon, hexagon, octagon, oval, or other polygons or curved closed shapes, or combinations thereof.

During operation, the various components of the supported riser apparatus 500 contract when in a relatively cool state and expand when in a relatively hot state. As such, the support member 540 may substantially elongate horizontally in hotter temperatures as compared with cooler temperatures. During heating, the support member 540 may slide into the recess of the expansion guide 560 during thermal expansion. During cooling the support member 540 may slide out of recess of the expansion guide 560. However, the expansion guide 560 is sized such that it may support the support member 540 even in cool temperatures where the support member 540 is in a contracted state. Thus, the support member 540 is held within the expansion guide 560 in all thermal conditions, but is allowed to slide during expansion and contraction. The void space within the expansion guide when cool can be filled with ceramic wool to minimize catalyst entering.

Figure 5:
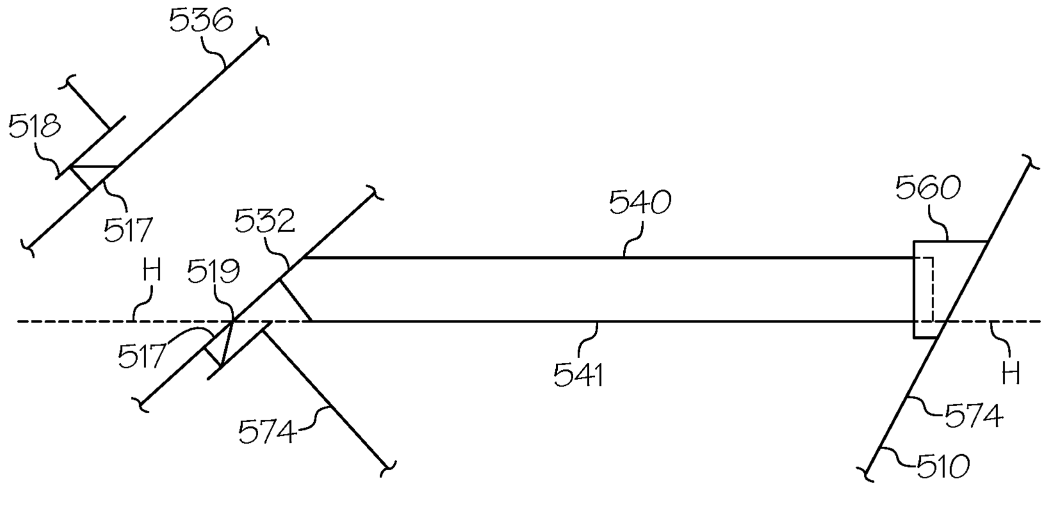
FIG. 5 schematically depicts a supported riser apparatus, according to one or more embodiments disclosed herein.

Referring now to FIG. 5, the supported riser apparatus 500 may further comprise a riser support cone 517 positioned in the riser port 518. The riser support cone 517 may be attached to the riser port 518. The riser support cone 517 may be attached to the non-vertical riser segment 536. In one or more embodiments, the riser support cone 517 may be attached to the non-vertical riser segment 536 around a circumference of the non-vertical riser segment 536. The riser support cone 517 may be operable to at least partially support the riser 530 at the riser port 518. The riser support cone 517 may have a top end 519. In one or more embodiments, the top end 519 of the riser support cone 517 proximate to riser attachment point 532 of the support member 540 may be at height H, and the bottom end 541 of the support member 540 may be at height H. In other words, the top end 519 of the support cone 517 at the bottom most portion of the riser port 518 may have the same height as the bottom end 541 of the support member 540. In one or more embodiments, the bottom end 541 of the support member 540 may contact the expansion guide 560 at height H. In such embodiments, the height at which the non-vertical riser segment 536 is supported by the riser support cone 517 and the support member 540 may be the same. In one or more embodiments, the riser 530 may be supported at the same height, height H, across a chord or diameter of the middle segment 574 of vessel 510.

In one or more embodiments, the supported riser apparatus 500 may be used in systems that include a riser termination device. Riser termination devices may be heavy and generally rely on the riser for support. Without wishing to be bound by theory, it is believed that the supported riser apparatus 500 described herein may provide sufficient support for a riser termination device even when the supported riser apparatus 500 comprises a non-vertical riser segment and the riser 530 may undergo thermal expansion in a non-vertical direction and the riser termination device is not independently supported. As such, it is believed that the supported riser apparatus 500 may be suitable for various systems where riser termination device is used. For example, such systems may include catalyst regeneration systems, such as regenerator section 300. However, it should be noted that the presently described supported riser apparatus 500 is not limited to use in a catalyst regeneration system or limited to use in systems that include a riser termination device.

In a first aspect of the present disclosure, a supported riser apparatus may be housed at least partially within a vessel. The supported riser apparatus may comprise a riser comprising a non-vertical riser segment, a non-linear riser segment, and a vertical riser segment. The non-linear riser segment may connect the non-vertical riser segment and the vertical riser segment. The non-vertical riser segment may enter the vessel through a riser port. The supported riser apparatus may further comprise a support member comprising a proximal end and a distal end. The proximal end of the support member may be connected to the non-vertical riser segment at a riser attachment point. The riser attachment point may be proximate the riser port. The support member may extend substantially horizontally from the riser attachment point across a width of the vessel. An angle between the support member and the non-vertical riser segment may be from 15° to 75°. The supported riser apparatus may further comprise a support structure connected to the riser and the support member. The support structure may be connected to the riser between the riser attachment point and vertical riser segment. The support structure may be connected to the support member between the proximal end and the distal end. The supported riser apparatus may further comprise an expansion guide connected to an interior surface of the vessel. The expansion guide may be shaped and positioned such that the support member slides across the expansion guide as the support member undergoes thermal expansion or thermal contraction.

A second aspect of the present disclosure may include the first aspect where the support structure comprises a substantially vertically aligned plate comprising a first edge connected to the support member and a second edge connected to the riser.

A third aspect of the present disclosure may include the second aspect where the second edge of the plate comprises a curved portion and a linear portion, wherein the curved portion of the second edge of the plate is connected to the non-linear riser segment, and wherein the linear portion of the second edge of the plate is connected to the non-vertical riser segment.

A fourth aspect of the present disclosure may include either of the second or third aspects where the support structure further comprises a one or more planar braces, and wherein the braces extend perpendicularly from a first side of the plate and a second side of the plate and wherein each brace is connected to either the first side of the plate or the second side of the plate.

A fifth aspect of the present disclosure may include the fourth aspect where at least one brace is oriented vertically.

A sixth aspect of the present disclosure may include either of the fourth or fifth aspects where at least one brace is connected to the support member.

A seventh aspect of the present disclosure may include any of the fourth through sixth aspects where at least one brace is connected to the riser.

An eighth aspect of the present disclosure may include any of the fourth through seventh aspects where at least one brace is oriented horizontally and wherein the at least one horizontally oriented brace is connected to at least one vertically oriented brace.

A ninth aspect of the present disclosure may include any of the fourth through eighth aspects where the braces extend from the first side of the plate and the second side of the plate symmetrically.

A tenth aspect of the present disclosure may include any of the fourth through ninth aspects where each brace comprises a thickness spanning the distance between the major surfaces of the brace, wherein the plate comprises a thickness spanning between the major surfaces of the plate, and wherein a ratio of the thickness of the plate to the thickness of each brace is from 5:1 to 1:5.

An eleventh aspect of the present disclosure may include any of the fourth through tenth aspects where each brace comprises a thickness spanning the distance between the major surfaces of the brace, where each brace comprises a width spanning the distance that the brace extends from the plate, and wherein a ratio of the width of each brace to the thickness of each brace is from 50 to 5.

A twelfth aspect of the present disclosure may include any of the first through eleventh aspects where a cross sectional area of an upper segment of the vessel is at least three times a maximum cross sectional area of the riser.

A thirteenth aspect of the present disclosure may include any of the first through twelfth aspects where the riser enters the vessel through the riser port and wherein the riser port is located in an upper segment or a middle segment of the vessel.

A fourteenth aspect of the present disclosure may include any of the first through thirteenth aspects where a cross sectional shape of the support member is substantially constant from the proximal end to the distal end.

A fifteenth aspect of the present disclosure may include any of the first through fourteenth aspects where the riser enters the vessel through the riser port in a diagonal direction, wherein the diagonal direction is from 15 to 75 degrees from vertical.

A sixteenth aspect of the present disclosure may include any of the first through fifteenth aspects, wherein a riser support cone is attached to the riser port and the non-vertical riser segment, wherein the riser support cone has a top end, and wherein the top end of the riser support cone, proximate to the riser attachment point of the support member, is at a height H, and the bottom end of the support member is at the height H.

The subject matter of the present disclosure has been described in detail and by reference to specific embodiments. It should be understood that any detailed description of a component or feature of an embodiment does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

For the purposes of describing and defining the present disclosure it is noted that the terms “about” or “approximately” are utilized in this disclosure to represent the inherent degree of uncertainty that may be attributed to any quantitative comparison, value, measurement, or other representation. The terms "about" and/or "approximately" are also utilized in this disclosure to represent the degree by which a quantitative representation may vary from a stated reference without resulting in a change in the basic function of the subject matter at issue.

It is noted that one or more of the following claims utilize the term "wherein" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." Furthermore, it should be understood that where a first component is described as "comprising" a second component, it is contemplated that, in some embodiments, the first component "consists" or "consists essentially of" that second component.

It should be understood that any two quantitative values assigned to a property may constitute a range of that property, and all combinations of ranges formed from all stated quantitative values of a given property are contemplated in this disclosure.

The invention claimed is:

1. A supported riser apparatus housed at least partially within a vessel, the supported riser apparatus comprising:

- a riser comprising a non-vertical riser segment, a non-linear riser segment, and a vertical riser segment, wherein the non-linear riser segment connects the non-vertical riser segment and the vertical riser segment, and wherein the non-vertical riser segment enters the vessel through a riser port;
- a support member comprising a proximal end and a distal end, wherein the proximal end of the support member is connected to the non-vertical riser segment at a riser attachment point, wherein the riser attachment point is proximate the riser port, wherein the support member extends substantially horizontally from the riser attachment point across a width of the vessel, and wherein an angle between the support member and the non-vertical riser segment is from 15° to 75°;
- a support structure connected to the riser and the support member, wherein the support structure is connected to the riser between the riser attachment point and vertical riser segment, and wherein the support structure is connected to the support member between the proximal end and the distal end; and
- an expansion guide connected to an interior surface of the vessel, wherein the expansion guide is shaped and positioned such that the support member slides across the expansion guide as the support member undergoes thermal expansion or thermal contraction.

2. The supported riser apparatus of claim 1, wherein the support structure comprises a substantially vertically aligned plate comprising a first edge connected to the support member and a second edge connected to the riser.

3. The supported riser apparatus of claim 2, wherein the second edge of the plate comprises a curved portion and a linear portion, wherein the curved portion of the second edge of the plate is connected to the non-linear riser segment, and wherein the linear portion of the second edge of the plate is connected to the non-vertical riser segment.

4. The supported riser apparatus of claim 2, wherein the support structure further comprises a one or more planar braces, and wherein the braces extend perpendicularly from a first side of the plate and a second side of the plate and wherein each brace is connected to either the first side of the plate or the second side of the plate.

5. The supported riser apparatus of claim 4, wherein at least one brace is oriented vertically.

6. The supported riser apparatus of claim 4, wherein at least one brace is connected to the support member, or wherein at least one brace is connected to the riser.

7. The supported riser apparatus of claim 4, wherein at least one brace is oriented horizontally and wherein the at least one horizontally oriented brace is connected to at least one vertically oriented brace.

8. The supported riser apparatus of claim 4, wherein the braces extend from the first side of the plate and the second side of the plate symmetrically.

9. The supported riser apparatus of claim 4, wherein each brace comprises a thickness spanning the distance between the major surfaces of the brace, wherein the plate comprises a thickness spanning between the major surfaces of the plate, and wherein a ratio of the thickness of the plate to the thickness of each brace is from 5:1 to 1:5.

10. The supported riser apparatus of claim 4, wherein each brace comprises a thickness spanning the distance between the major surfaces of the brace, where each brace comprises a width spanning the distance that the brace extends from the plate, and wherein a ratio of the width of each brace to the thickness of each brace is from 50 to 5.

11. The supported riser apparatus of claim 1, wherein a cross sectional area of an upper segment of the vessel is at least three times a maximum cross sectional area of the riser.

12. The supported riser apparatus of claim 1, wherein the riser enters the vessel through the riser port and wherein the riser port is located in an upper segment or a middle segment of the vessel.

13. The supported riser apparatus of claim 1, wherein a cross sectional shape of the support member is substantially constant from the proximal end to the distal end.

14. The supported riser apparatus of claim 1, wherein the riser enters the vessel through the riser port in a diagonal direction, wherein the diagonal direction is from 15 to 75 degrees from vertical.

15. The supported riser apparatus of claim 1, wherein a riser support cone is attached to the riser port and the non-vertical riser segment, wherein the riser support cone has a top end, and wherein the top end of the riser support cone, proximate to the riser attachment point of the support member, is at a height H, and the bottom end of the support member is at the height H.

* * * * *